United States Patent
Alsup et al.

(10) Patent No.: US 9,483,264 B2
(45) Date of Patent: Nov. 1, 2016

(54) TRACE-BASED INSTRUCTION EXECUTION PROCESSING

(71) Applicant: Samsung Electronics Co., Ltd., Suwon-si, Gyeonggi-do (KR)

(72) Inventors: Mitchell Alsup, Austin, TX (US); Boris Beylin, Palo Alto, CA (US); Michael Shebanow, San Jose, CA (US); SungSoo Park, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 14/458,158

(22) Filed: Aug. 12, 2014

(65) Prior Publication Data

US 2015/0324228 A1  Nov. 12, 2015

Related U.S. Application Data

(60) Provisional application No. 61/991,338, filed on May 9, 2014.

(51) Int. Cl.
*G06F 9/44* (2006.01)
*G06F 9/30* (2006.01)
*G06F 9/48* (2006.01)

(52) U.S. Cl.
CPC ............ *G06F 9/30* (2013.01); *G06F 9/30145* (2013.01); *G06F 9/30181* (2013.01); *G06F 9/48* (2013.01); *G06F 9/4881* (2013.01)

(58) Field of Classification Search
CPC . G06F 11/006; G06F 11/277; G06F 11/3636
See application file for complete search history.

(56) References Cited

U.S. PATENT DOCUMENTS

| | | | | |
|---|---|---|---|---|
| 8,234,650 B1 * | 7/2012 | Eppstein | ............... | G06F 9/5072 709/220 |
| 8,726,252 B2 | 5/2014 | Eichenberger | | |
| 9,317,296 B2 | 4/2016 | Rogers | | |
| 2006/0112377 A1 * | 5/2006 | Nacul | ..................... | G06F 8/456 717/140 |
| 2010/0149185 A1 * | 6/2010 | Capewell | ............. | G06T 15/005 345/426 |
| 2013/0198760 A1 * | 8/2013 | Cuadra | .................. | G06F 9/445 718/106 |
| 2014/0164737 A1 | 6/2014 | Collange | | |
| 2014/0181477 A1 | 6/2014 | Vaidya | | |
| 2014/0184616 A1 * | 7/2014 | Gupta | .................. | G06F 11/277 345/505 |
| 2015/0324198 A1 | 11/2015 | Alsup et al. | | |

OTHER PUBLICATIONS

U.S. Non-Final Office Action for U.S. Appl. No. 14/458,165 mailed Sep. 1, 2016.

* cited by examiner

*Primary Examiner* — Li B Zhen
*Assistant Examiner* — Lenin Paulino
(74) *Attorney, Agent, or Firm* — Sherman IP LLP; Kenneth L. Sherman; Steven Laut

(57) ABSTRACT

A method for executing instructions in a thread processing environment includes determining a multiple requirements that must be satisfied and resources that must be available for executing multiple instructions. The multiple instructions are encapsulated into a schedulable structure. A header is configured for the schedulable structure with information including the determined multiple requirements and resources. The schedulable structure is schedule for executing each of the multiple instructions using the information.

24 Claims, 15 Drawing Sheets

TRACE-BASED INSTRUCTION EXECUTION PROCESSING

CROSS-REFERENCE TO RELATED APPLICATION

This application claims the priority benefit of U.S. Provisional Patent Application Ser. No. 61/991,338, filed May 9, 2014, which is incorporated herein by reference in its entirety.

TECHNICAL FIELD

One or more embodiments generally relate to a single-instruction multiple-thread (SIMT) processing environments and, in particular, to structuring multiple instructions into a schedulable unit for execution without stalling and reducing register file accesses.

BACKGROUND

SIMT processors choose which instruction to execute almost every SIMT cycle. Each instruction identifies the resources that it requires, and when those resources are available the instruction becomes a candidate for execution. At each SIMT cycle a potentially different group of threads are selected to execute.

SUMMARY

One or more embodiments generally relate to structuring multiple instructions into a schedulable unit for processing the multiple instructions without stalling and reducing register file accesses. In one embodiment, a method provides for executing instructions in a thread processing environment. In one embodiment, the method includes determining a multiple requirements that must be satisfied and resources that must be available for executing multiple instructions. In one embodiment, the multiple instructions are encapsulated into a schedulable structure. In one embodiment, a header is configured for the schedulable structure with information including the determined multiple requirements and resources. In one embodiment, the schedulable structure is schedule for executing each of the multiple instructions using the information.

In one embodiment a non-transitory computer-readable medium having instructions which when executed on a computer perform a method comprising: selecting a plurality of instructions to execute in a thread processing environment. In one embodiment, a plurality of requirements that must be satisfied and resources that must be available for executing the plurality of instructions are determined. In one embodiment, the plurality of instructions are encapsulated into a schedulable structure. In one embodiment, a header is configured for the schedulable structure with information comprising the determined plurality of requirements and resources. In one embodiment, the schedulable structure is scheduled for executing each of the plurality of instructions using the information.

In one embodiment, a graphics processor for an electronic device comprises: one or more processing elements coupled to a memory device. In one embodiment, the one or more processing elements: select a plurality of instructions to execute, determine a plurality of requirements that must be satisfied and resources that must be available for executing the plurality of instructions, encapsulate the plurality of instructions into a schedulable structure, configure a header for the schedulable structure with information comprising the determined plurality of requirements and resources, and schedule the schedulable structure for executing each of the plurality of instructions using the information.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
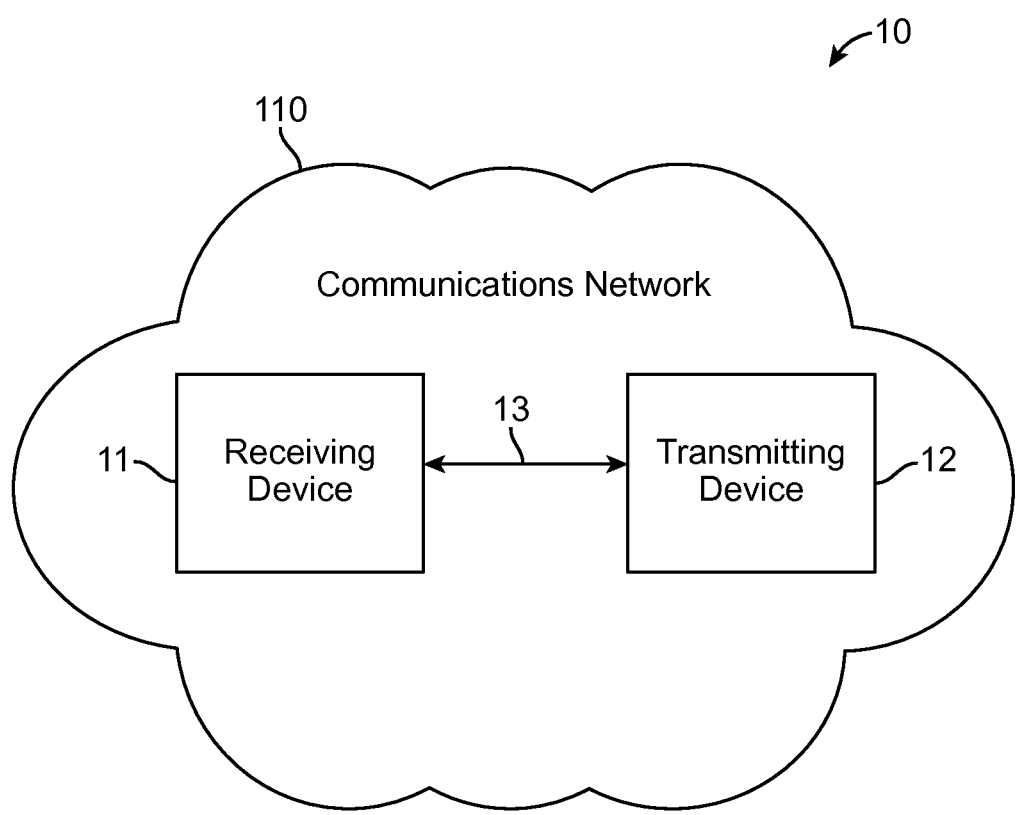
FIG. 1 shows a schematic view of a communications system, according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments provide organizing multiple instructions into schedulable structure referred to as a trace. In one embodiment, a trace is a region of code that contains a number of instructions and the following properties: a trace will not begin execution until specified events have occurred; a trace will not begin execution unit all required resources are available; and a trace once entered into execution, executes to completion. In one or more embodiments, the trace bundles a plurality of instructions into a single schedulable unit. The trace contains a header (e.g., a trace header). In one embodiment, the trace header includes a list of resources that the multiple instructions in the trace need or require. In one embodiment, when all needed/required resources are available, the trace may be scheduled, and a large plurality of instructions may execute such that no stalls will occur.

In one embodiment, in addition the trace header is organized to simplify matching of resource requests to available resources, and the SIMT scheduling process. In one embodiment, because the trace runs to completion, the data-path may be augmented with a small low overhead tunnel register file. In one or more embodiment, the tunnel file reduces the power of accessing the register file of a GPU pipeline. In one embodiment, results and operands may be stored in the tunnel register file for subsequent use within a trace, reducing the number of register file accesses. In one embodiment, the tunnel register file does not persist across trace boundaries and thus may be considered inexpensive with respect to context switching and SIMT scheduling. In one embodiment, the shader compiler may use the tunnel register file as a small repository and avoid many read and many write accesses to the register file, which reduces power consumption.

In one embodiment, a method provides for executing instructions in a thread processing environment. In one embodiment, the method includes determining a multiple requirements that must be satisfied and resources that must be available for executing multiple instructions. In one embodiment, the multiple instructions are encapsulated into a schedulable structure. In one embodiment, a header is configured for the schedulable structure with information including the determined multiple requirements and resources. In one embodiment, the schedulable structure is schedule for executing each of the multiple instructions using the information.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a Blackberry®). Such protocols may include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include a mobile telephone devices, television systems, cameras, camcorders, a device with audio video capabilities, tablets, wearable devices, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
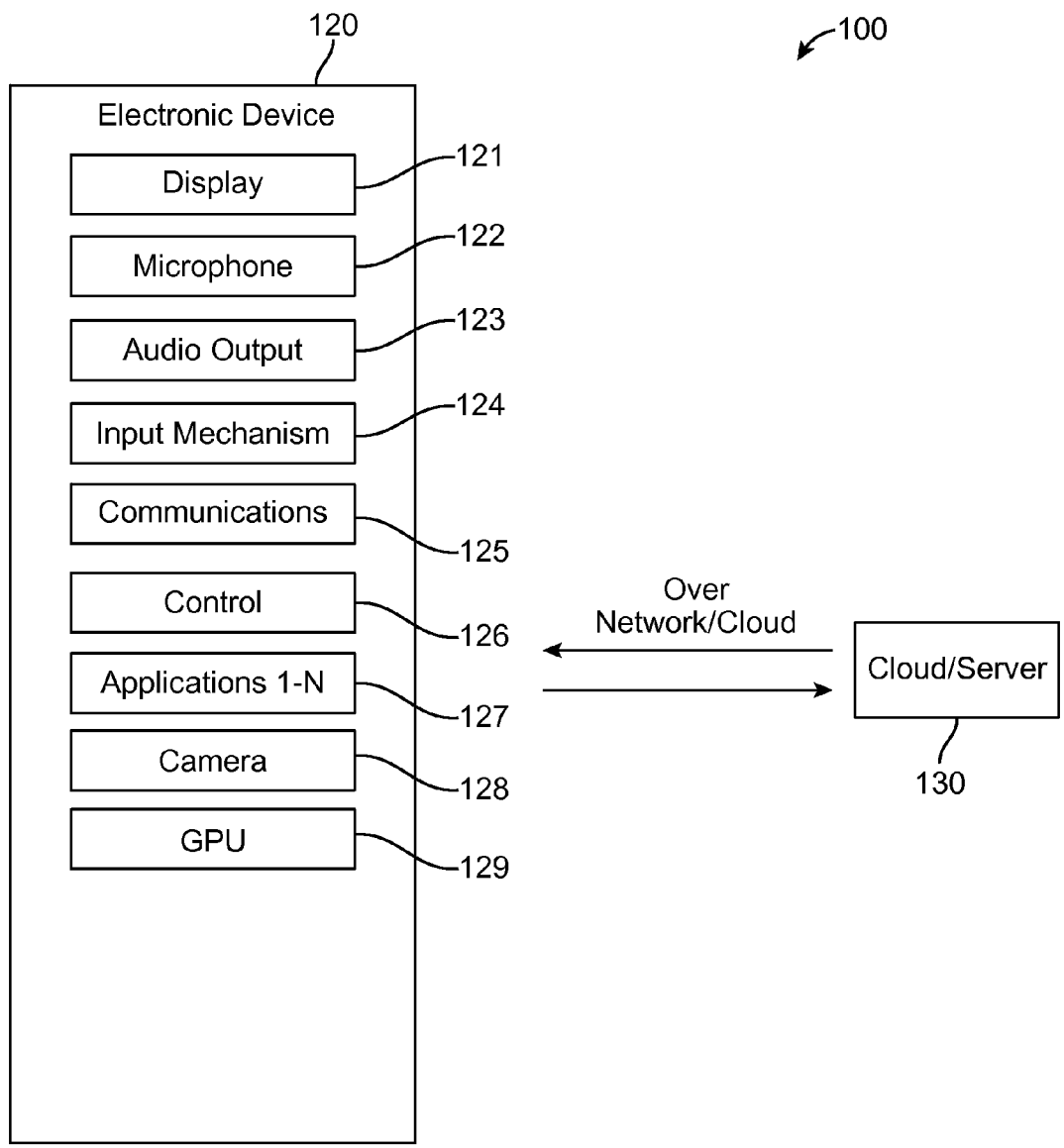
FIG. 2 shows a block diagram of an architecture for a system including a mobile device including a graphical processing unit (GPU) module, according to an embodiment.

FIG. 2 shows a functional block diagram of an architecture system 100 that may be used for graphics processing in an electronic device 120. Both the transmitting device 12 and receiving device 11 may include some or all of the features of the electronics device 120. In one embodiment, the electronic device 120 may comprise a display 121, a microphone 122, an audio output 123, an input mechanism 124, communications circuitry 125, control circuitry 126, a camera module 128, a GPU module 129, and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., Bluetooth® headphones or a Bluetooth® headset).

In one embodiment, the display 121 may include any suitable screen or projection system for providing a display visible to the user. For example, display 121 may include a screen (e.g., an LCD screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), social networking applications (e.g., Facebook®, Twitter®, Etc.), an Internet browsing application, etc. In some embodiments, the electronics device 120 may include one or multiple applications operative to perform communications operations. For example, the electronics device 120 may include a messaging application, a mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the GPU module 129 comprises processes and/or programs for processing images and portions of images for rendering on the display 121 (e.g., 2D or 3D images). In one or more embodiments, the GPU module may comprise GPU hardware and memory (e.g., a unified heap architecture (UHA) 410 (FIG. 4), static random access memory (SRAM), dynamic RAM (DRAM), core processor (s), cache, etc.).

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
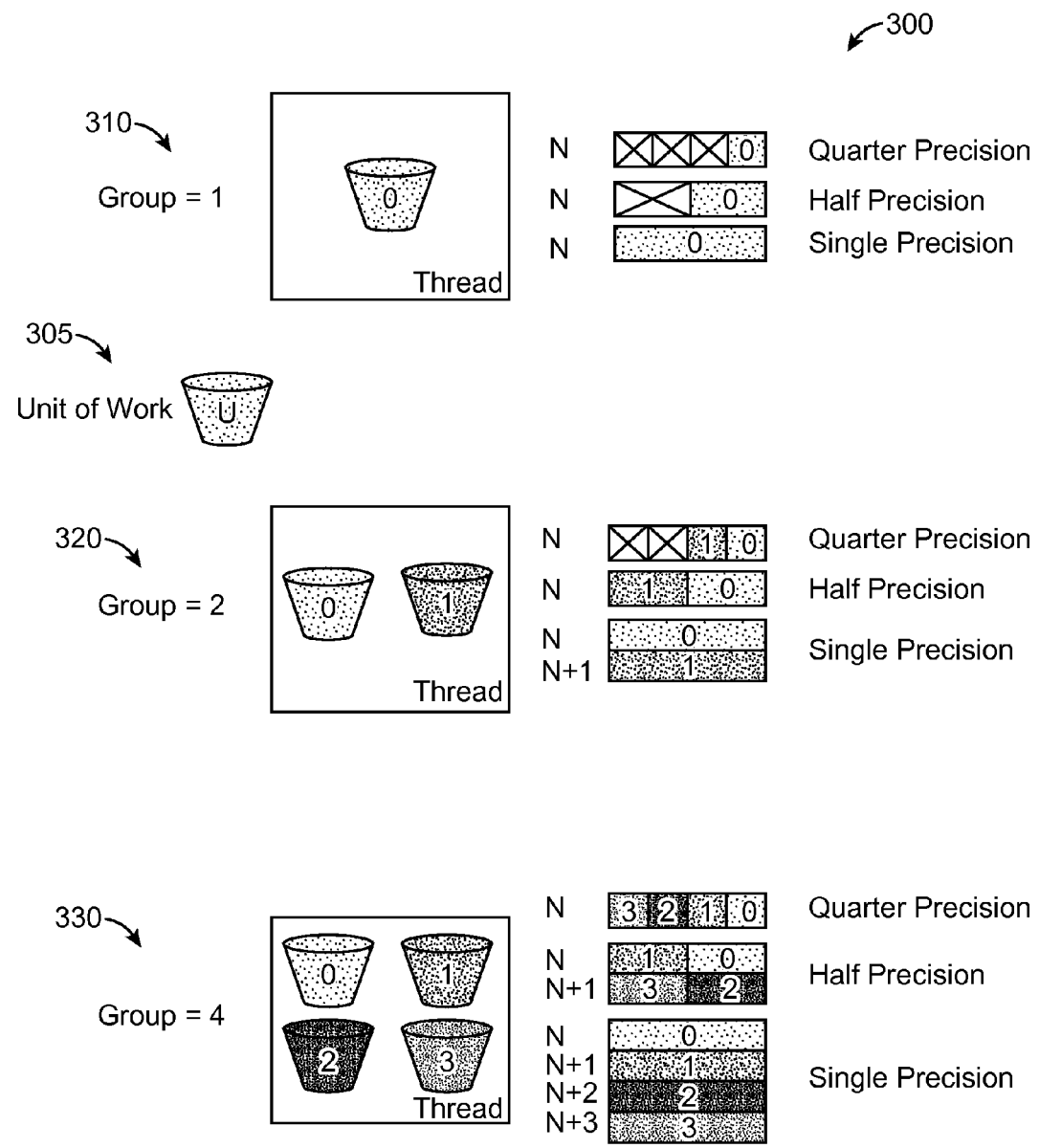
FIG. 3 illustrates packing including one or more units of work.

FIG. 3 shows a diagram 300 of example WARP structures including one or more units of work. In one example, a unit of work is a set of input data that will pass through a shader <program> to produce an output data set. In one embodiment, the compiler bundles 1, 2, or 4 units of work into a single thread in order to efficiently process data of different sizes. This bundle is known as a pack. The number of elements in a pack determine how less than full width computation are performed, as shown in the diagram 300. In one example, braid −1 310 shows a thread with a unit of work 305 0, braid −2 320 shows a thread with units of work 305 0 and 1, and braid −4 330 shows a thread with units of work 305 0, 1, 2 and 3.

In one example, a number of work units 305 are bound into a thread and then a number of threads are bound together to execute a shader <program> into a structure referred to as a WARP. A WARP binds a multiplicity of work units 305 into a single point of control. In one example embodiment, the WARP may contain up to 32 threads, and a compiler of a GPU (e.g., part of the GPU module 129, FIG.

2) may pack up to 4 units of work 305 (e.g., braid −4 330) into a single thread. In one example embodiment, the packing factor determines the placement of input data into the threads of a WARP. In one embodiment, a processing element 400 (FIG. 4) may process up to 8 WARPs. In one example embodiment, each WARP is associated with 64-registers in the scalar register file. In one example embodiment, each scalar register is 32-bits in size. In one example embodiment, a 3-bit WARP Identifier is concatenated with the scalar register specifier in an instruction in order to fully address a scalar register file. In one example embodiment, all threads in the WARP share the same scalar register file.

In one example embodiment, a thread is a point of control within a WARP. Each thread is associated with a <thread> Register File. In one example embodiment, a thread may be allocated as few as 8 and as many as 256 registers with 8 register granularity. In one example embodiment, the WARP carries a register base address which relocates instruction register specifiers into Register File addresses. In one example embodiment, the register file 420 (FIG. 4) contains 32 KBytes of storage, which may be allocated to various WARPs. In one example embodiment, when the shader program uses 32 or fewer registers per thread, all 8 WARPs may be active simultaneously. In one embodiment, WARPs from different shaders may have different sized Register Files. In one example embodiment, the size of a given register file 420 is found in the shader header 610 (FIG. 5).

In one example embodiment, a 2-bit WARP braiding field identifies the mode of operation of the threads within the WARP. In one embodiment, the braiding enables the compiler of the GPU to produce optimal codes when shader programs utilize half precision and quarter precision instructions. In one example embodiment, the instructions compute 2 or 4 units of work 305 in a single instruction per thread when braided. In one example embodiment, the units of work 305 are governed by an execution mask, one bit of each mask governs a unique unit of work over the WARP. In one example embodiment, each instruction in a shader <program> identifies the associated unit of work 305 so that it may be properly governed. In one embodiment, the execution mask is manipulated to effect predication and control transfer. In one example embodiment, a simple code sequence performs most of the manipulation with compares instructions with label instructions.

In one embodiment, a WARP executes instructions on behalf of all bound threads in such a way that each instruction sees the results of the previous instruction and may use such as operands immediately via forwarding or with some delay by utilizing a tunnel file. In one example embodiment, a trace 650 (FIG. 6) is a shader program fragment and consists of a trace header 670 and a number of instructions 660-661. In one example embodiment, the trace header 670 contains a set of resources that must be available prior to running the instructions 660-661 with the trace 650 and a set of bit vectors of outstanding <previous> request that must have been performed prior to scheduling this WARP back into execution. The WARP scheduler uses this information in deciding which WARP to schedule <next>.

In one example embodiment, a trace 650 (FIG. 6) has a limited maximum size (in the range of 64 to 128 instructions), and the compiler of the GPU will break a trace when the instruction sequence is too long, or when an instruction needs an outstanding request as an operand (such as a Load result or a texture result). In one embodiment, a WARP is in one of 4 states, Idle, Initializing, Executing, or Waiting. Once configured and initialized, the WARP may be scheduled into operation when the resources required are available. In one example embodiment, once scheduled the WARP will execute all of the instructions in a trace 650. This gives the WARP scheduler time to find a subsequent WARP that may enter execution (again).

Figure 4:
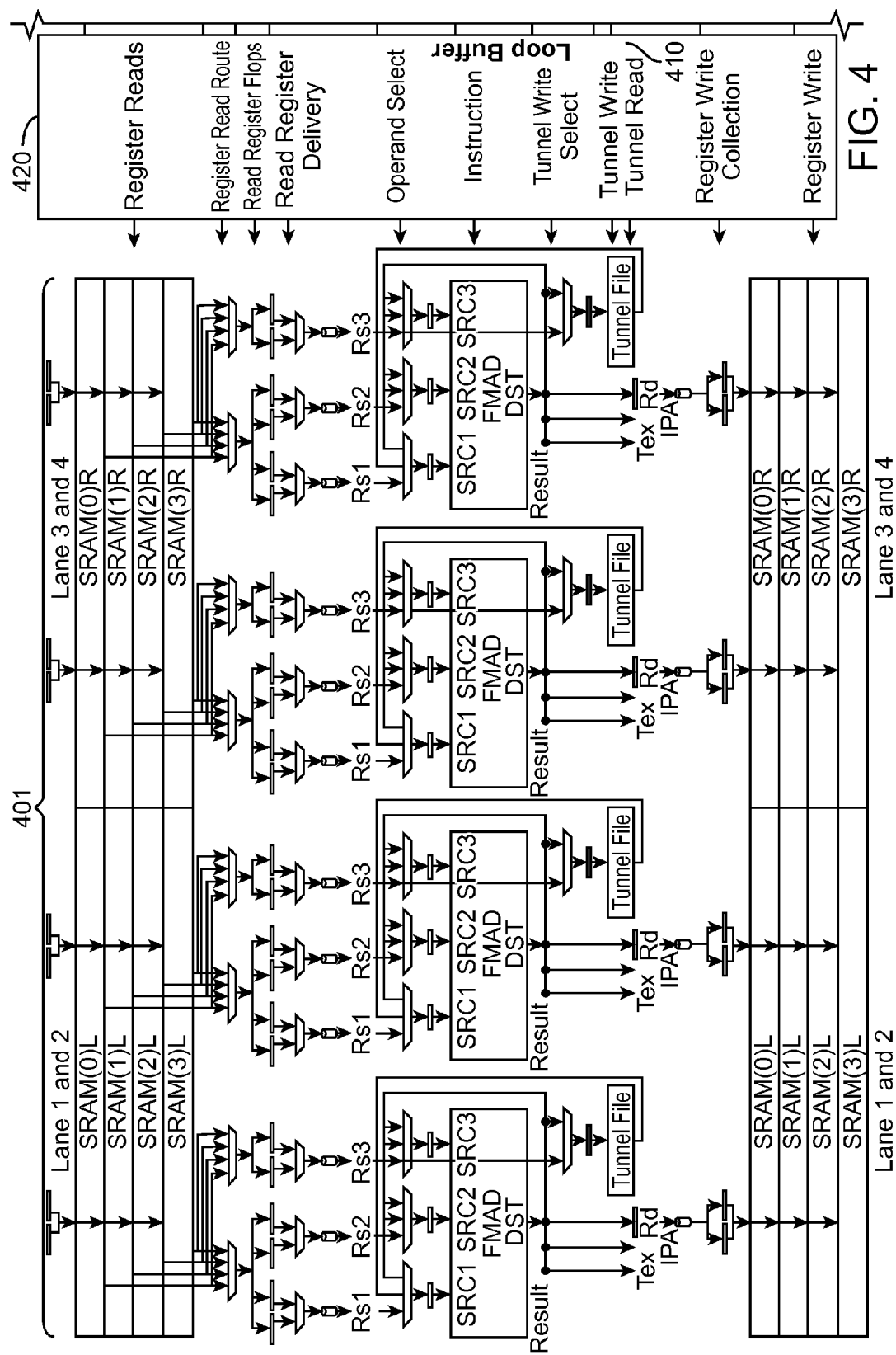
FIG. 4 shows an example processing element architecture, according to an embodiment.
Figure 4:
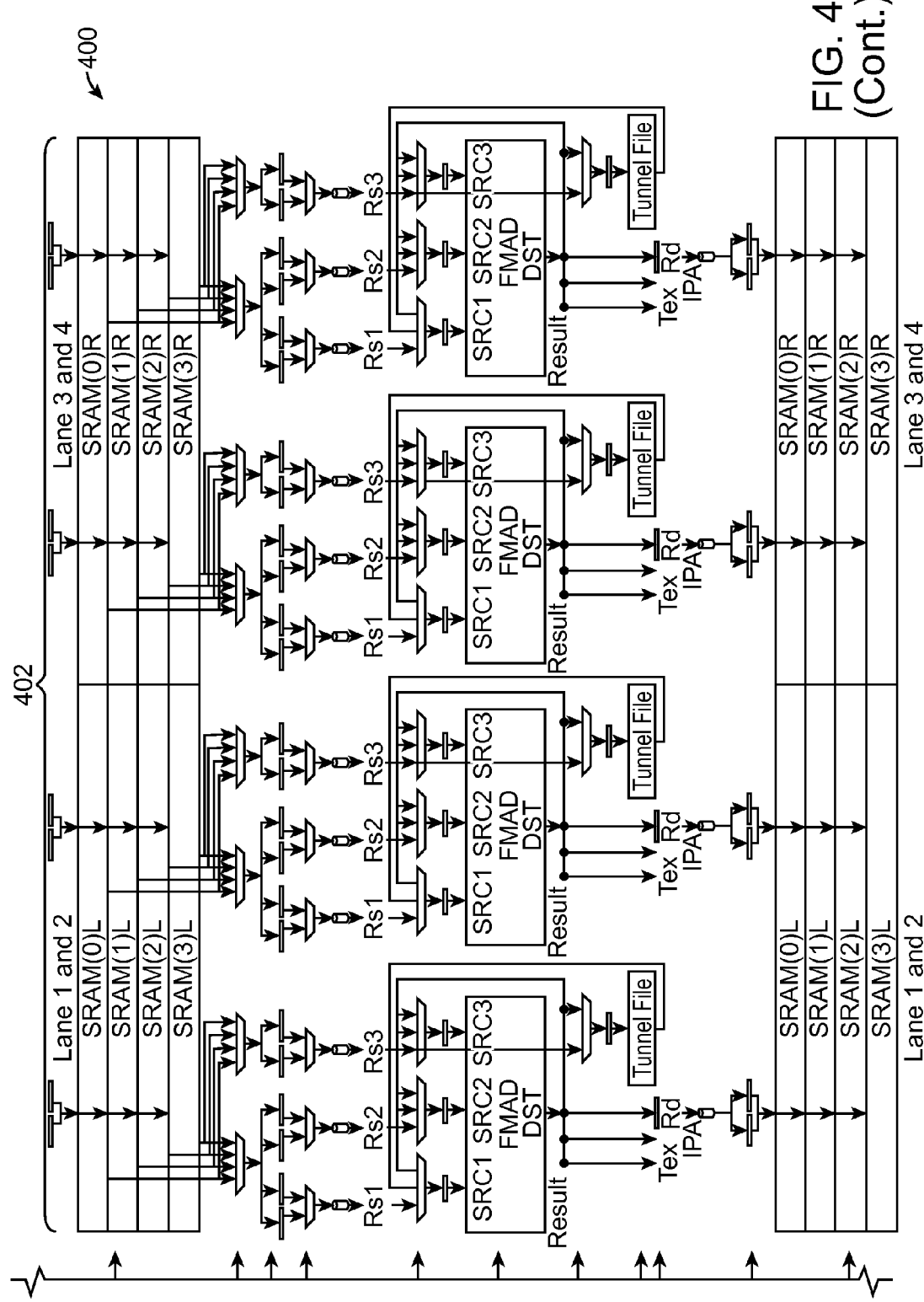
Figure 5:
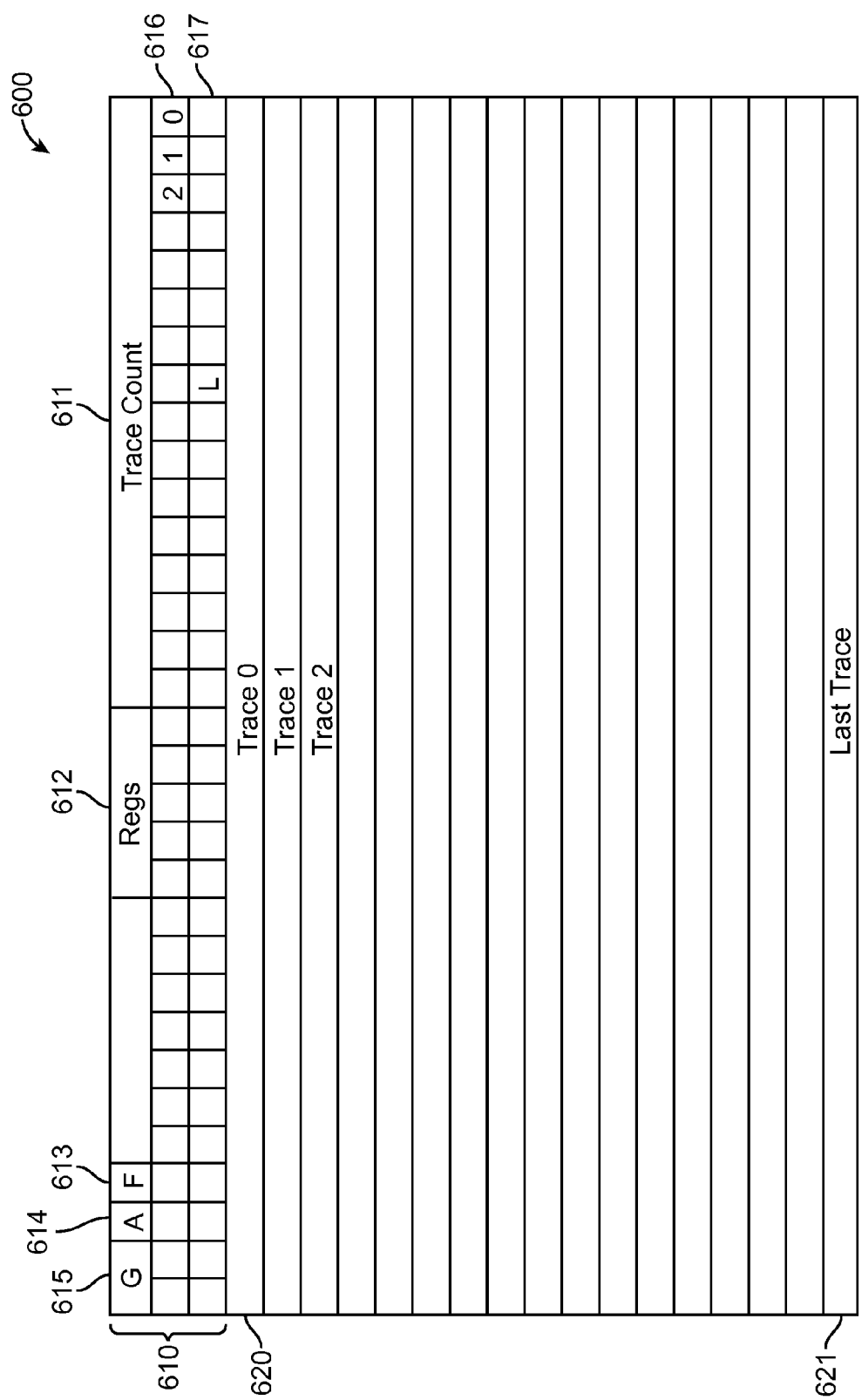
FIG. 5 shows an example shader format structure, according to an embodiment.

In one example embodiment, an Idle WARP may be assigned work units 305, assigned a shader program, and allocated a Register File 420 (FIG. 4). A shader constructor initializes a WARP by moving units of work 305 to the register file 420, fixed function requests may be pre-processed, and then the WARP may be scheduled into execution. After Initialization WARPS toggle between the Waiting and Executing states until the end of the shader <program> at which time they return to the Idle state.

Figure 6:
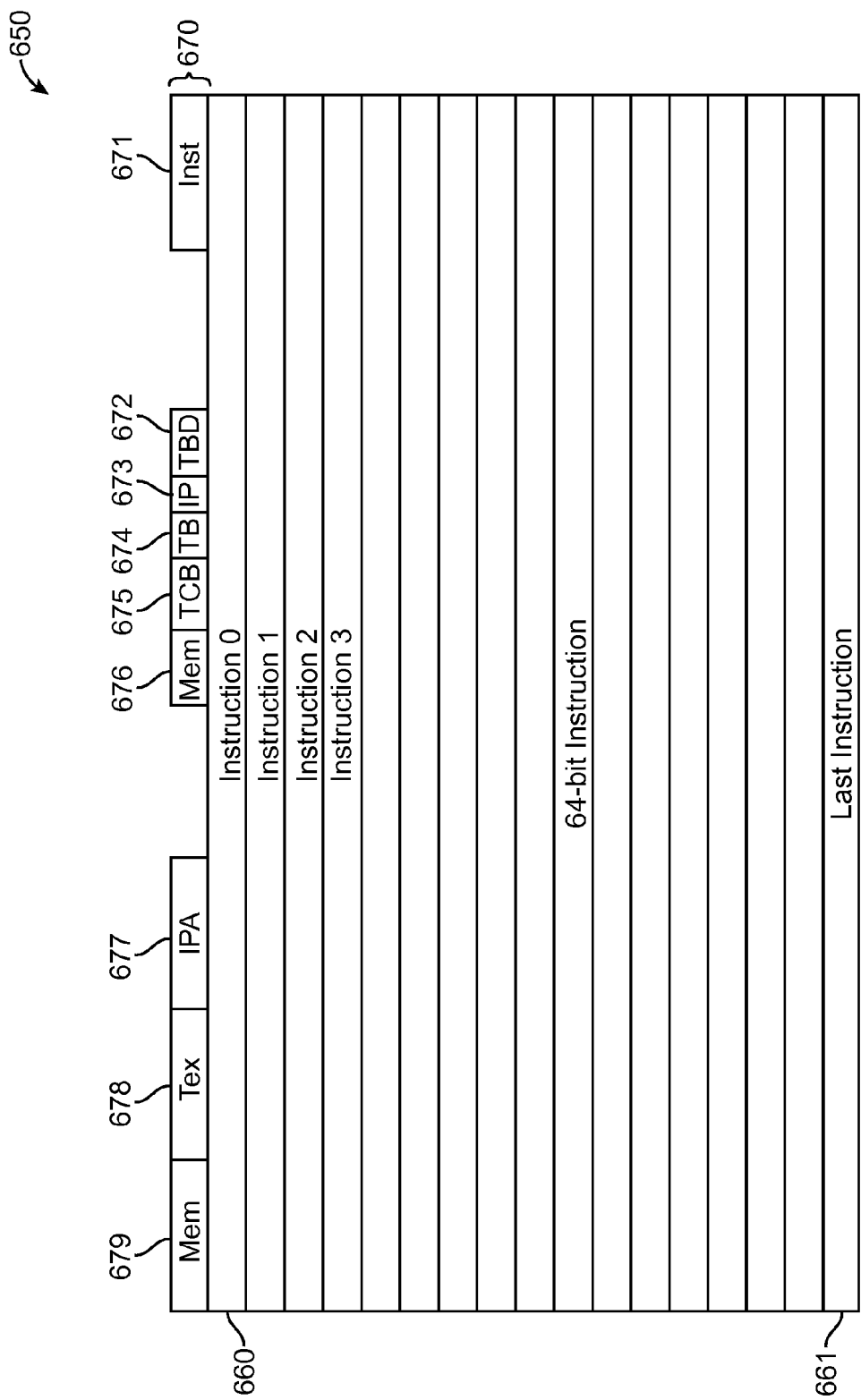
FIG. 6 shows an example trace format structure, according to an embodiment.

In one example embodiment, a WARP waits at a trace header 670 (FIG. 6). In one embodiment, the trace header 670 contains the list of events that must take place before scheduling the WARP (back) into execution and resources required to run the trace to completion. Once the resources are available and the events have occurred, the WARP becomes a candidate. In one example embodiment, the WARP scheduler picks from among the contending WARP candidates for the next WARP to enter execution.

In one example embodiment, after the WARP is scheduled, the WARP scheduler preloads the Loop Buffer 410 (FIG. 4) by shipping the instructions 660-661 (FIG. 6) in a trace 650 from the instruction cache to the instruction decoder in the Loop Buffer 410. The instruction decoder decodes the instruction and places the decoded information into the Loop Buffer 410. In one example embodiment, once the trace 650 is installed in the Loop Buffer 410, the WARPs may be scheduled.

In one embodiment, the WARP scheduler keeps track of which traces 650 are loaded into the Loop Buffer 410 and skips the installation if the trace 650 is already present. In one example embodiment, the WARP scheduler prioritizes WARPs pending on the same trace 650 over WARPs pending on a trace 650 yet to be loaded. In one embodiment, a WARP may be configured to perform several units of work 305. In one example embodiment, the WARP may begin interpolation and texture accesses prior to the start of the pixel shader program. In one embodiment, the register file allocation is deferred until these computations are ready to deliver values to the register file 400 (FIG. 4). The register file 400 is then allocated and parts of it are prefilled with input data. In one example embodiment, any required scalar data is also written into the scalar register file.

FIG. 4 shows an example processing element 400 architecture that may be used for implementing one or more embodiments. In one embodiment, the processing element 400 comprises of 8 lanes 401-402 of computation, a register file 420, and a Loop Buffer 410. In one embodiment, the Loop Buffer 410 contains a small instruction cache, the instruction decoder and the instruction sequencer. In one embodiment, a register comprises a software value that may be delivered into computation and received from computation, and the register file 420 is an organization of SRAM instances that holds registers.

In one example embodiment, the FMAD units perform single precision floating point arithmetic instructions and are instrumental in μCode implementing the transcendental instructions. In one embodiment, the Integer unit performs most integer arithmetic, logic operations, and memory address calculations. In one example embodiment, the BIT manipulation unit performs bit manipulation operations. In one embodiment, pipeline time flows strictly downward except for the two forwarding paths back to the computation unit input multiplexers. In one example embodiment, the structures at the top of the processing element 400 are the same PDP SRAM components as the structures at the bottom of the processing element 400. In one example embodiment, the upper PDP SRAM components are used to read operands and deliver them into computation, while the lower PDP SRAM components are used to write computed values back into the register file 420.

In one embodiment, for the processing element 400 only four operand flip-flops may satisfy the needs of the collectors. In one example embodiment, both normal sequencing {Single Precision, Half Precision and Quarter Precision} and special functional units (SFU) sequencing {Double Precision and certain Integer instructions} may be satisfied by accessing the SRAMs slightly differently. In one example embodiment, the registers are used in even-odd pairs for the first two accesses and in even-even and odd-odd pairs on the second set of accesses, which complicates the control but saves the number of required multiplexors.

FIG. 5 shows an example shader 600 format structure, according to an embodiment. In one embodiment, a shader 600 is composed of a shader header 610, a shader Active Search Table 616, an array of trace pointers 617 (one for each trace 620-621) in the shader 600), and a number of traces 600-621. In one embodiment, a shader 600 begins on a cache line boundary (32 or 64 bytes), and each element in the shader 600 is one word in length (4 bytes).

In one example embodiment, the shader header 610 contains a trace count 611 of the number of traces 620-621, the register count 612 of the number of registers per thread, braid control information 615, and a Fixed Function bit 613. In one example embodiment, immediately following the shader header 610 is the Active Search Table 616 that includes a number of traces divided by 32 of an Activating Search Optimizer 616.

In one example embodiment, the braid specifier of the braid control information 615 is used by the fixed function units in depositing a number of work units 305 (FIG. 3) into a single thread. In one example embodiment, the A bit 614 specifies if the Active Search Table is list present. In one embodiment, the Active Search Table is a bit vector with one bit for each Trace 620-621. In one example embodiment, this list is used to rapidly search forward for the first activating instruction when the execution mask has become zero. In one example embodiment, the search is performed with a Find First Set circuit that may process 32 (or even 64) traces 620-621 per cycle in the search. In one example embodiment, once the trace number is found the trace pointer list is indexed, and the WARP is scheduled to run that trace on its next opportunity.

In one example embodiment, the Active Search Optimizer tables are only used in shaders with Forward Branching, CALLs and RETurns, and indirect Jumping. In one embodiment, shaders 600 without these features may omit the tables by clearing the A bit 614 in the shader header 610. In one example embodiment, most shaders 610 are small enough such that these tables represent essentially no overhead. In one example embodiment, when the Fixed Function Specifier bit 613 (F) is set, the first trace 620-621 in a shader 600 (i.e., trace number 0 or Trace 0) contains instructions for fixed function units. In one example embodiment, these instructions run autonomously and potentially concurrently with WARP execution. In one embodiment, if the F bit 613 is not set, then trace 0 is the first trace 620-621 to be executed by the shader program.

In one embodiment, there are a number of Trace Pointers in the trace pointer array 617 once a particular trace 620-621 is identified by number. In one example embodiment, the trace pointer is used to access instructions over a 36-bit address space. In one example embodiment, the value in the pointer is shifted up by 4 bits (4 bits corresponds to 32-Byte cache lines and a 36-bit address space, 5 corresponds to 64-Byte cache lines and a 37-bit address space) to become the byte address of the instruction. In one embodiment, shader threads receive an input data set, and compute an output data set.

In one example embodiment, another field in the shader header 610 includes data used to configure the Graphics Pipeline (e.g., graphics pipeline 1100, FIG. 11) to fill the registers correctly based on both group and size of input data item. In one example embodiment, an additional field in the shader header 610 includes data to configure the receiving Graphics Pipeline 1100 for the data being emitted. In one example embodiment, the additional fields may also be stored in a Graphics Pipeline Configuration data structure, which contain pointers to the shaders pertinent to this pipeline configuration.

In one example embodiment, when a Graphics Pipeline 1100 (FIG. 11) is configured, the driver initializes constant scratch from uniforms accessed by the shader programs which will run in this configuration. In one example embodiment, constant scratch is shared across 4 processing elements 400 (FIG. 4) in a Shader core of a GPU. In one embodiment, the pre-configuration eliminates the load instruction and its associated latency from the shader program. In one example embodiment, the input data set is placed into the register file 420 (FIG. 4) by shader constructors prior to the WARP starting to run the shader 600. In one example embodiment, the output data is emitted (typically) near the end of the shader 600 to other fixed function units.

FIG. 6 shows an example trace 650 format structure, according to an embodiment. In one embodiment, a trace 650 is a series of instructions 660-661 that will be performed entirely from one scheduling event of one WARP. In one example embodiment, a trace 650 comprises a trace header 670, and a series of processing element 400 (FIG. 4) instructions 660-661. In one example embodiment, the trace header 670 contains a list of events that must have transpired prior to scheduling and a list of all resources that the instructions will require in order to run to completion. In one example embodiment, a trace 650 may contain forward and backwards branches, including loops. In one example embodiment, no instruction in a trace 650 may be dependent upon a result with unknowable latency.

In one embodiment, the trace header 670 and all instructions 660-661 are 64-bits in size and begin on a cache line boundary. In one example embodiment, the trace header 670 contains bit vectors used to represent the outstanding events that must occur prior to this WARP being <re>scheduled. In one embodiment, the trace header 670 includes fields for 8-outstanding memory references 679, 8-outstanding texture references 678, and 8 outstanding Interpolation references (IPA) 677. In one example embodiment, another 8-bit field exists for Texture Buffer Done (TBD) 672. In one example embodiment, the trace header 670 also contains field descriptors of the amount of buffer space required prior to this WARP being scheduled. In one embodiment, the Mem field 676 describes how many memory references must be available in the Memory Address Buffer prior to scheduling the WARP. In one embodiment, the TCB field 675 describes how many Texture Coordinates must be allocated in the Texture Coordinate Buffer prior to schedule. In one embodiment, the TB field 674 describes the persistence of the TCB allocation, and the IP field 673 specifies the number of IPA requests (IPA is mainly Push Mode, the alternative is to send (Pull) Page Table Entries to the processing element 400 (FIG. 4) and have it compute its own interpolations).

In one example embodiment, the number of instructions 671 in a trace 650 is limited to the size of the loop buffer 410 (FIG. 4), for example between 64 and 128 pre-decoded instructions. In one example embodiment, since each instruction 660-661 processes up to 32 computations, 8 computations at a time over 4 beats of the pipeline 1100 (FIG. 11), once scheduled a trace 650 may take several hundred cycles to complete even without any looping behavior. This gives the WARP scheduler time to schedule the successor WARP and also to pre-load the Loop Buffer so that the WARP switch may take place between instructions 660-661 with little or no temporal overhead.

In one example embodiment, as a trace 650 executes, a number or outstanding events are recorded. In one embodiment, the trace header 670 of the subsequent trace contains a bit-vector of outstanding events that must have become resolved prior to scheduling the WARP on the subsequent trace. In one example embodiment, this means WARPs are not scheduled into execution until all required outstanding results have been performed. In one embodiment, this also means that the shader compiler may decide that some of the outstanding events are not needed in order to execute the subsequent trace.

In one embodiment, as instructions 660-661 are decoded into the Loop Buffer 410 (FIG. 4), if the instruction activates threads, then the instruction decoded sets a bit in the Activate search table 616 (FIG. 5). In one example embodiment, if the execution mask ever becomes empty, this Activate search table 616 is used to rapidly skip instructions that have no chance of turning idle units of work back into an active state. In one example embodiment, along with the Activate Search Table 616 used by the WARP scheduler, once the execution mask becomes clear, then the only instructions that get executed are the ones that may turn inactive units of work 305 (FIG. 3) back into active units of work 305.

In one example embodiment, if the F bit 613 (FIG. 5) in the shader header 610 is set, trace 0 contains a list of instructions for fixed function units to perform autonomously or by means of stimulation from the shader 600. The latter is used to manage register file 420 (FIG. 4) pressure by the compiler of the GPU. In one example embodiment, this trace 650 generally consists of Interpolation requests and Texture Requests; many of which may be processed prior to allocating a register file 420 to the WARP. In one example embodiment, only when the texture request is nearing completion does a register file 420 even need to be allocated to the waiting WARP.

Figure 7:
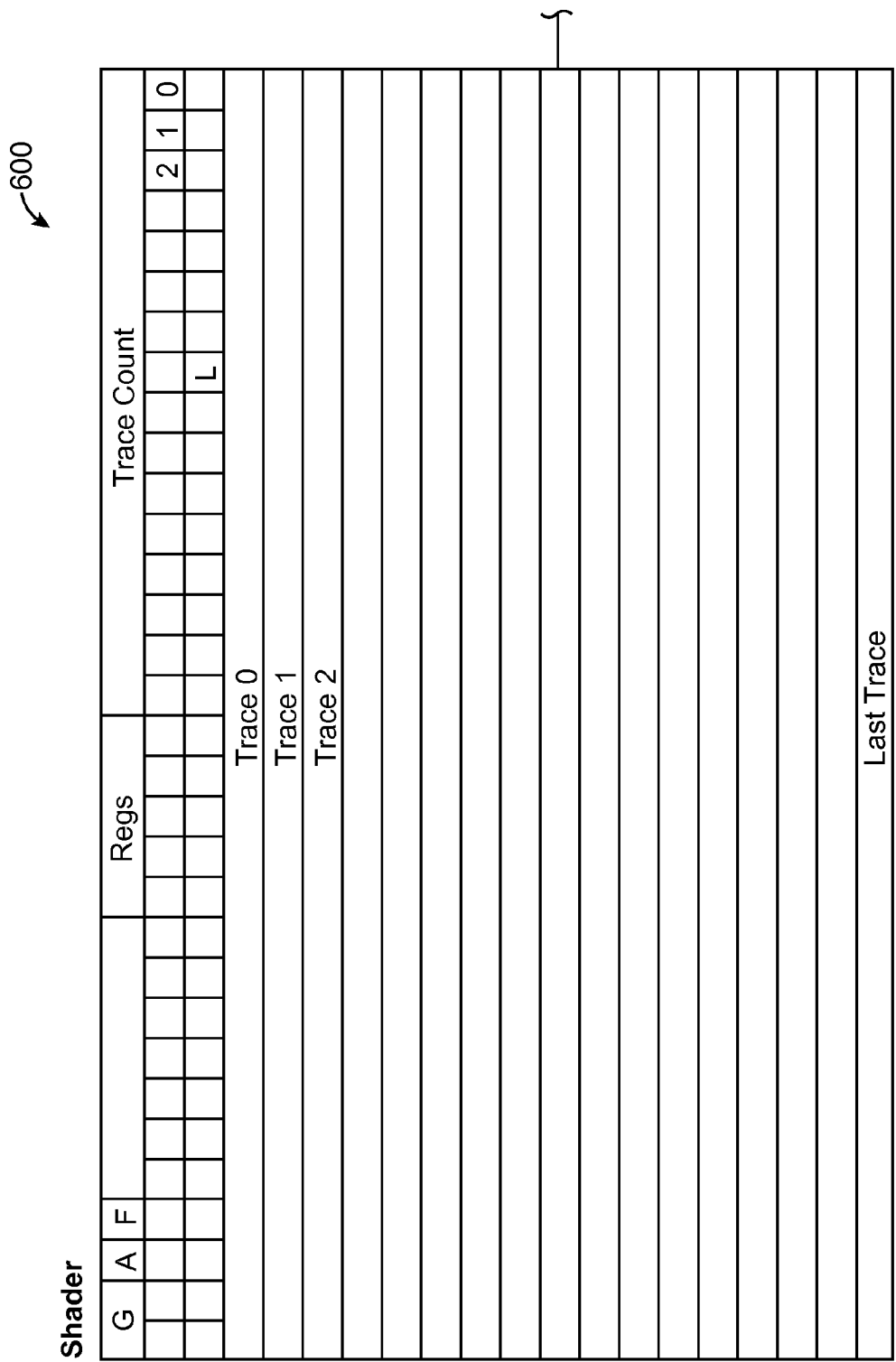
FIG. 7 shows an example of a shader and trace relationship, according to an embodiment.
Figure 7:
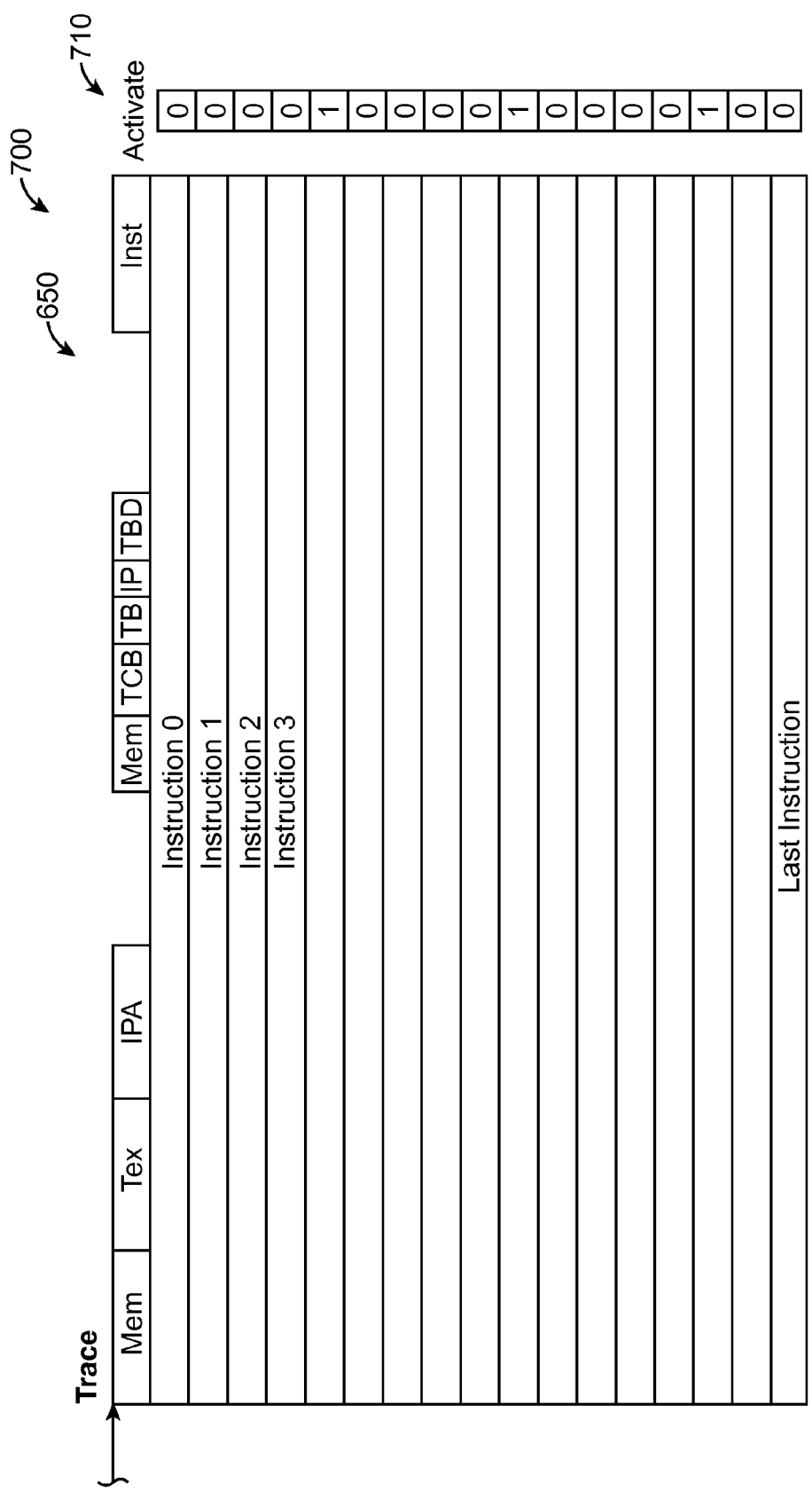

FIG. 7 shows an example 700 of a shader 600 and trace 650 relationship, according to an embodiment. In one example embodiment, both shader 600 and trace 650 are located on cache line boundaries. In one embodiment, the addressable instruction space is increased by the same amount 64 Byte cache lines enable 32-bit pointers to point into 38-bit byte-addressable space.

Figure 8:
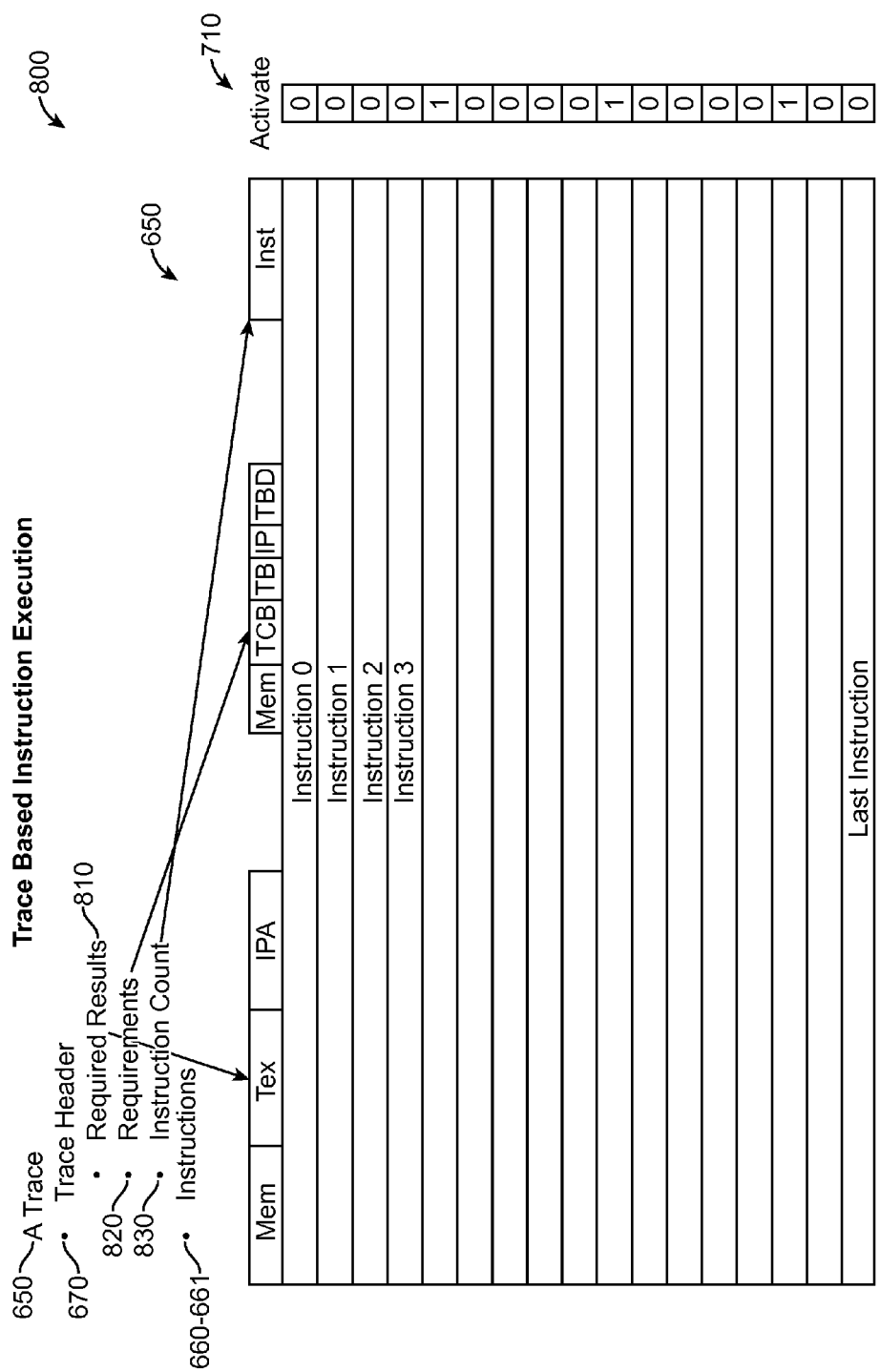
FIG. 8 shows an example trace structure format and header with multiple requirements, according to an embodiment.

FIG. 8 shows an example 800 trace 650 structure format and header 670 with multiple requirements, according to an embodiment. In one embodiment, the trace header 670 includes required results 810 (e.g., dependent hardware events that must complete), resource requirements 820 and instruction count 830, The example 800 also shows the activate field 710 that is used to activate the instructions 660-661. In one embodiment, the trace 650 includes bit vectors of which previous resource requests must be satisfied, and the instruction counts of new requests that will be issued.

Figure 9:
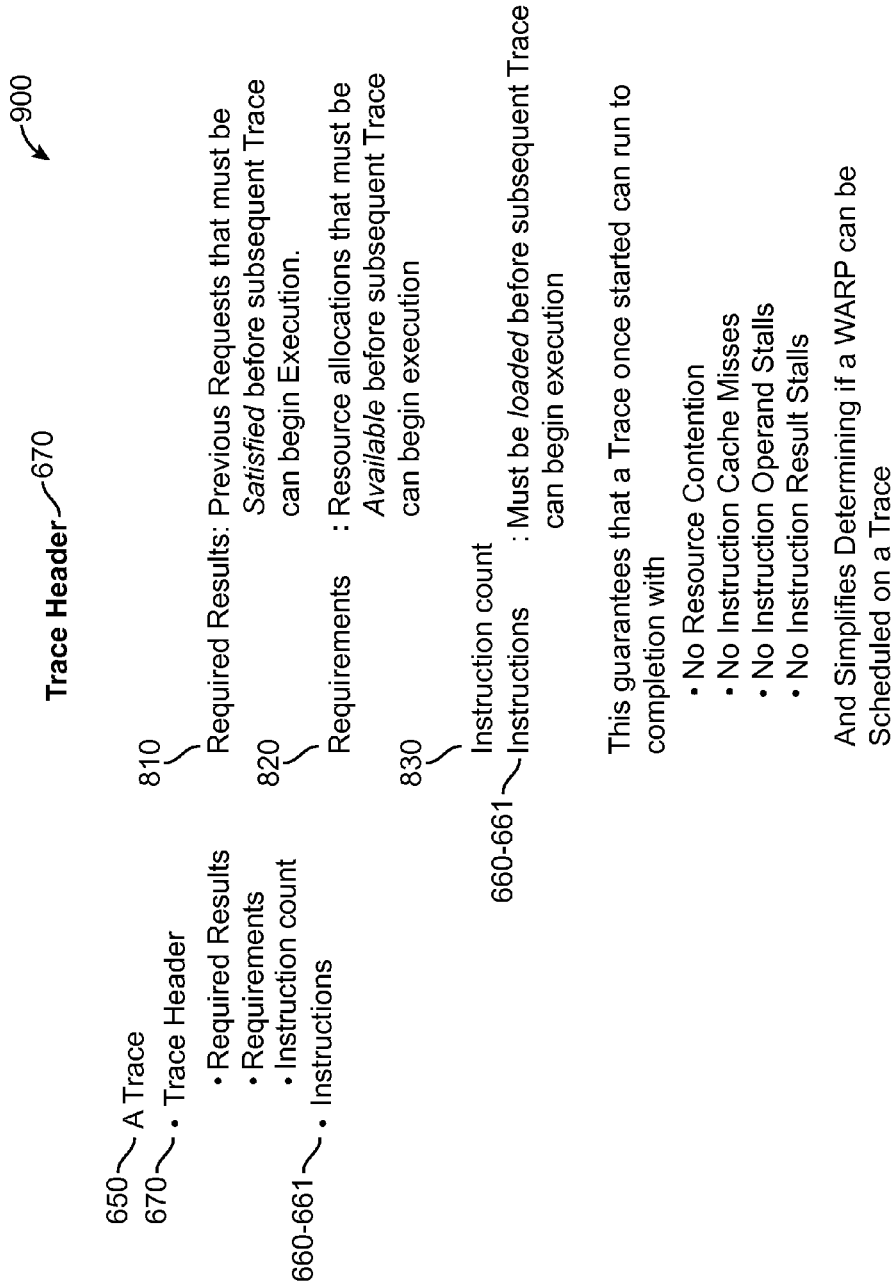
FIG. 9 shows an example trace header organization, according to an embodiment.

FIG. 9 shows an example trace header 670 organization 900, according to an embodiment. In one embodiment, the organization 900 shows the structure of the trace 650 including the trace header 650 and instructions 660-661. In one embodiment, the required results 810 are shown to include previous requests that must be satisfied before a subsequent trace may begin execution. In one embodiment, the requirements 820 include resource allocations that must be available before a subsequent trace may begin execution. In one embodiment, the instruction count is the number of instructions 660-661 that must be loaded before a subsequent trace may begin execution. In one embodiment, the organization 900 of the trace 650 guarantees that a trace 650, once started, may run to completion with: no resource contention, no instruction cache misses, no instruction operand stalls, and no instruction result stalls (and simplifies determining if a WARP may be scheduled on a trace 650).

Figure 10:
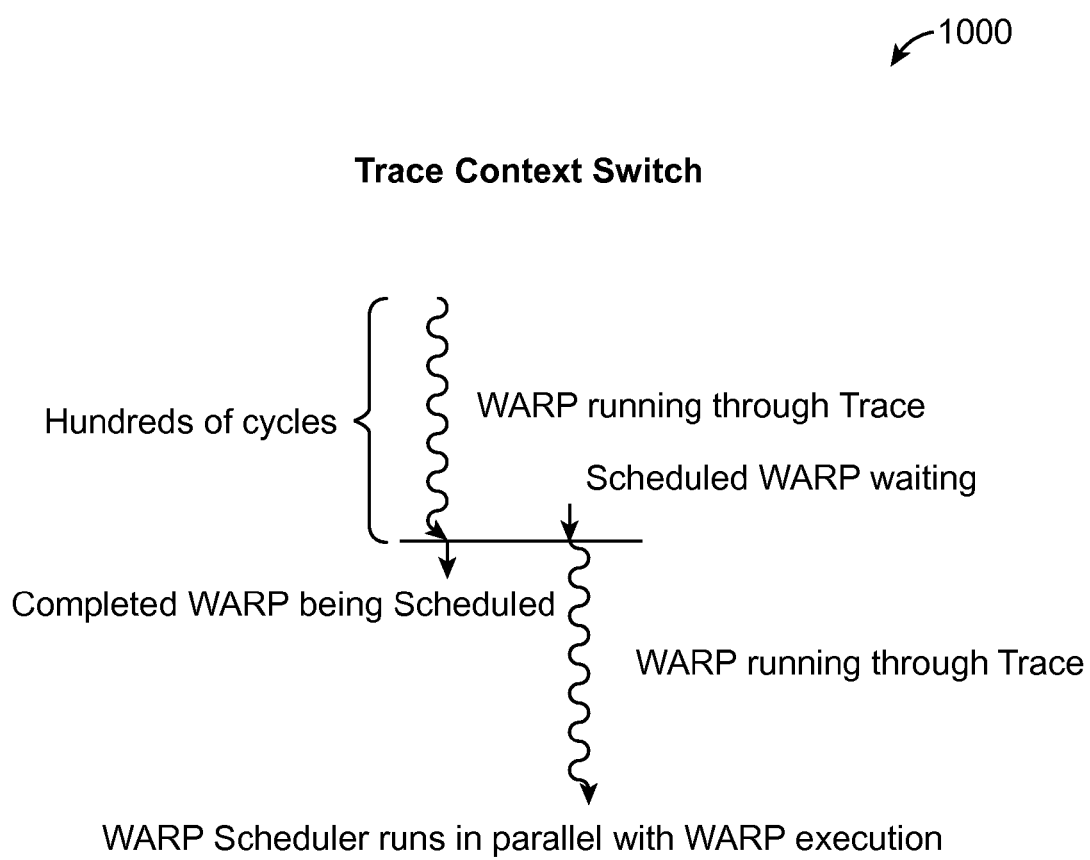
FIG. 10 shows an example trace context switch and general execution flow, according to an embodiment.

FIG. 10 shows an example depiction of a trace context switch and general execution flow 1000, according to an embodiment. In one example embodiment, once a trace 650 (FIG. 6) is scheduled, the WARP scheduler loads the instructions of the trace 650 into the Loop Buffer 410 (FIG. 4) through the instruction decoder. In one embodiment, the loading may take place while another WARP is already executing instructions from another section of the Loop Buffer 410. In one embodiment, when the executing WARP reaches the end of its trace 650, the processing element 400 switches to the scheduled WARP and begins execution. In one embodiment, this WARP switch may take place between instruction execution so the last instruction of one WARP is immediately followed by the first execution of the scheduled WARP, as illustrated in the example execution flow 1000.

In one embodiment, instructions are fetched from the Loop Buffer 410 over the execution pipeline of the processing element 400 and provide the data path control signals to orchestrate the desired computation, while data is fetched from the register file 420 and the (register) tunnel file are merged with just computed data. In one embodiment, after computation has completed, result data is available to be forwarded to subsequent instructions 660-661 immediately, written into the tunnel file, or written back to the register file 420. In one embodiment, the tunnel file is not persistent across a trace 650 boundary.

Figure 11:
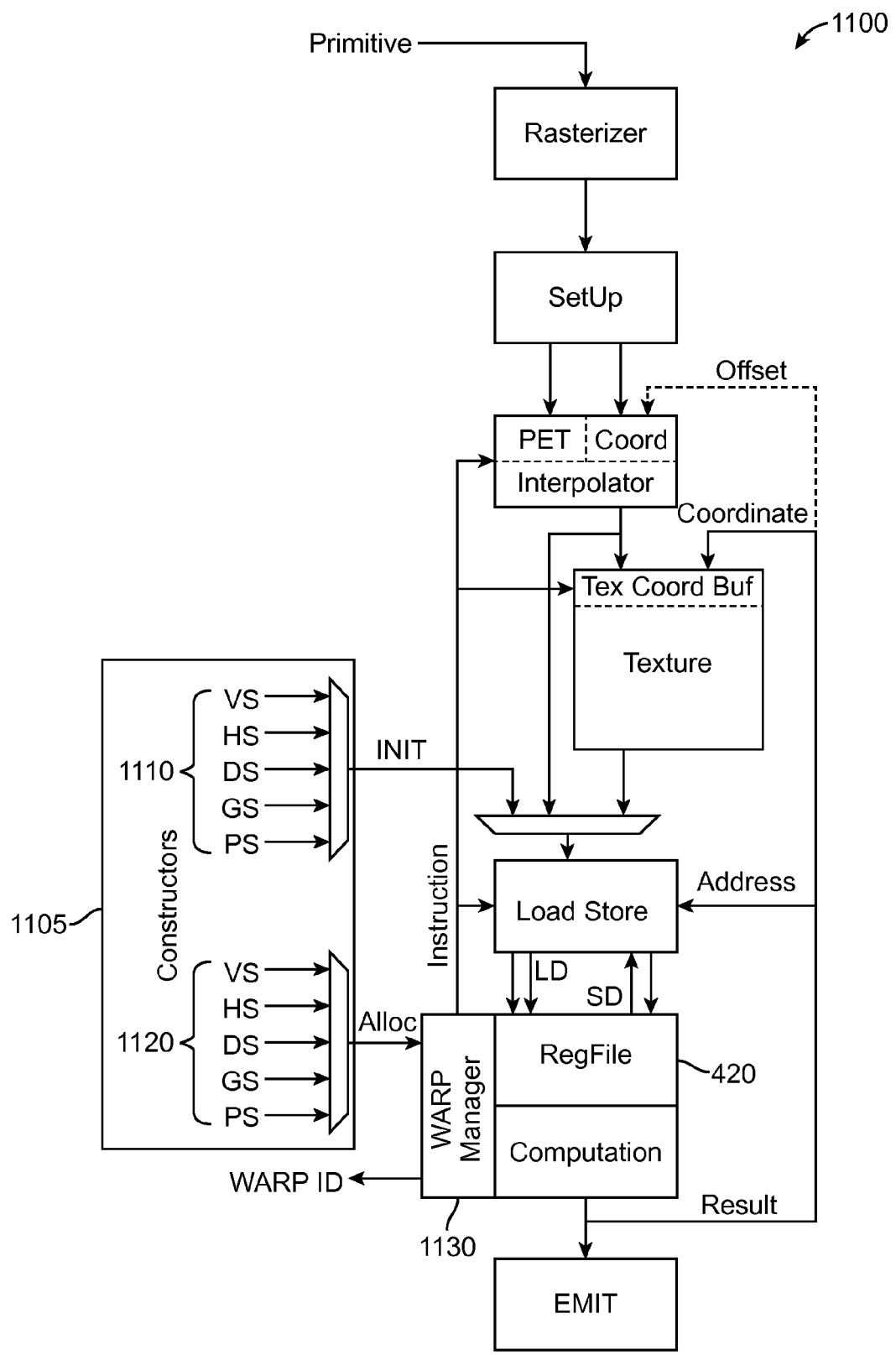
FIG. 11 shows an example block diagram of a processing element and graphics pipeline for a graphics processor, according to an embodiment.

FIG. 11 shows an example block diagram of a graphics pipeline 1100 for a graphics processor or GPU, according to an embodiment. In one embodiment, a shader core comprises of 4 processing element 400 (FIG. 4) pairs and a number of fixed function units. In one embodiment, some of the fixed function units (e.g., the Load Store) are distributed with the processing element 400 pairs, while others such as Texture and Interpolation are centralized. In one example embodiment, many of the fixed function units are illustrated in the example pipeline 1100 along with pertinent conceptual busses. In one example embodiment, from the viewpoint of the processing element 400, there are six busses that allow the processing element 400 to interact with the rest of the graphics pipeline 1100.

In one embodiment, the pipeline 1100 includes a 256-bit result plus 32-bits enable bus. In one embodiment, the bus serves to deliver results to the next stage of the graphics pipeline 1100 through the EMIT unit, to deliver addresses to the load store unit, to deliver texture coordinates to the Texture Coordinate Buffer, and to deliver offset data to the interpolator for interpolation. In one embodiment, the pipeline 1100 includes a 256-bit Load plus a 32-bit enable bus. The enable bus serves to deliver Load data, Texture results, Interpolation results, and Initialization data into the register file 420. In one embodiment, attached to the enable bus, and running two cycles earlier is a Load address bus which delivers the 9-bit register address to the loop buffer 410 and 32-write enable bits to the register file 420.

In one embodiment, the pipeline 1100 includes a 256-bit Store Data plus a 32-bit enable bus. In one embodiment, this enable bus delivers register read data to the Load Store Unit. In one embodiment, attached to the enable bus and running two cycles earlier is the store address bus. In one embodiment, the protocol on the enable bus is to send the address on the pipeline beat, two cycles later there will be a signal indicating if data will be arriving in the subsequent cycle and persisting for 4 beats of the pipeline.

In one embodiment, the pipeline 1100 includes a 64-bit instruction bus. In one embodiment, the instruction bus delivers instruction bit patterns and relocated register addresses to the Load Store, Texture, and Interpolator. In one embodiment, most uses of the instruction bus only need 12-odd bits to be transferred, but an instruction may need up to 60-bits to be transferred along with the 9 translated register file address bits.

In one embodiment, the Rasterizer is handed a Primitive in the beginning of the pipeline 1100 flow. In one example embodiment, draw commands enter the pipeline 1100 from the graphics driver (or optionally from a command processor). In one example embodiment, associated with a draw command is a graphics state (GS) (the current state of the OpenGL state machine for a pipeline implementing the OpenGL API). In one embodiment, the Rasterizer determines if the primitive is in the current Tile, and if so, it sets up the Plane Equation Table for Setup, then proceeds to flow out Quads of pixels into the Interpolator coordinate buffer. In one embodiment, the Interpolator uses the Plane Equation Tables for each Quad and interpolates the quads into frame coordinate space. The result may be delivered directly to the texture unit Texture Coordinate Buffer or it may be delivered to the Register File 420 of a processing element 400 (FIG. 4) through the Load Store Unit. In one embodiment, the Texture Unit uses coordinates stored in the Texture Coordinate Buffer and produces textured Quads under control of instructions.

In one embodiment, the constructors 1105 are in charge of allocating and building WARPs for processing. In one embodiment, this process consists of allocating a WARP, associating a Register File 420 with that WARP, filling the Register File 420 with initialization data and signaling the WARP manager 1130 to start this WARP into execution. The Load Store Unit performs memory reference instructions, and provides an interface between other fixed function units and the Register Files 420. In one embodiment, the WARP manager 1130, Register File 420 and Computation Unit comprise the processing element 400 (FIG. 4) including the Loop Buffer 410.

In one embodiment, the EMIT unit routes data emitted from shader programs 1110 and 1120 down the graphics pipeline 1100 to the next stage of processing. In one embodiment, much of the time the emitted data is shipped to shared memory so that a new WARP in a potentially different processing element 400 (FIG. 4) may begin processing the next stage of the graphics pipeline 1100. In one embodiment, the Clip Cull and Viewport (CCV) unit (not shown) of the pipeline 1100 builds an intermediate representation of fully processed primitives that will be processed by the Rasterizer. In one embodiment, the ROP unit (not shown) takes the computed, textured Quads and integrates their data into the frame buffer.

In one embodiment, a graphics processing slice consists of eight processing elements 400 (FIG. 4), a number of fixed function units, and an interface to the GPU network. In one embodiment, the GPU delivers a batch of work to the graphics processing slice. The graphics processing slice parses the work into WARP sized bundles, initializes the graphics pipeline 1100 and shader <program>, and assigns threads of work to WARPs which will run on processing elements 400. It should be noted that the example pipeline 1100 is illustrative and provides a guide as how data is routed around the graphics processing slice. In one embodiment, there are eight processing elements 400, four Load Store units, one set of five Constructors 1105, one or more Interpolators, and one or more Texture units.

In one embodiment, the register file 420 of a WARP is controlled by the base offset contained within the WARP data structure. In one embodiment, a register in an instruction is mapped into the Register File 420 by adding the base shifted up by 2 bits in the WARP to the register in the instruction. In one embodiment, the add computation is performed by a 5-bit adder. In one embodiment, a register address presented to centralized fixed function units contains a Processing Element Number, a Register File bit, and a register address. In one example embodiment, the low order 2 bits of the register address select the SRAM bank. In one embodiment, the Processing element number routes the request to the register file 420 of the appropriate processing element 400 while the Register File bit selects between a <thread> Register File access or a Scalar Register File access.

Figure 12:
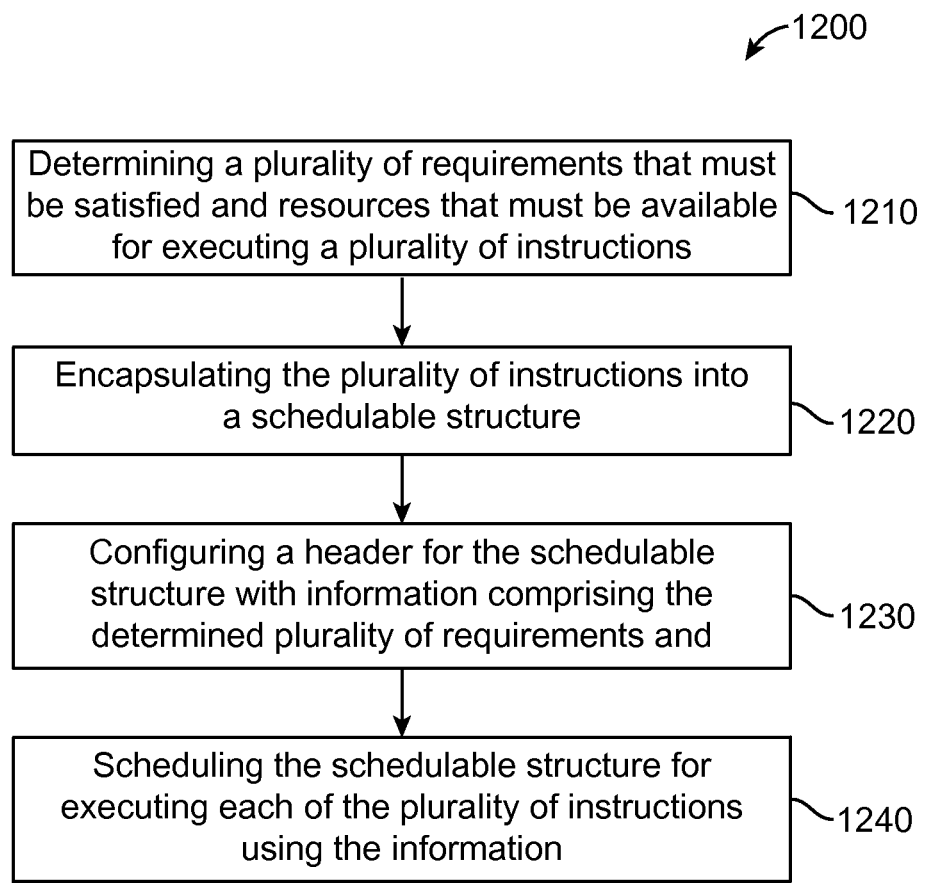
FIG. 12 shows a block diagram for a process for structuring multiple instructions into a schedulable unit for processing the multiple instructions without stalling, according to one embodiment.

FIG. 12 shows a block diagram for a process 1200 for executing instructions in a thread processing environment for a GPU (e.g., a GPU of GPU module 129, FIG. 2), according to one embodiment. In one embodiment, in block 1210 a plurality of requirements that must be satisfied and resources that must be available for executing a plurality of instructions (e.g., instructions 660-661, FIG. 6) are determined. In one embodiment, in block 1220 the plurality of instructions are encapsulated into a schedulable structure (e.g., trace 650). In one embodiment, in block 1230 a header (e.g., header 670) for the schedulable structure is configured with information comprising the determined plurality of requirements and resources.

In one embodiment, in block 1240 the schedulable structure is schedule for executing each of the plurality of instructions using the information. In one embodiment, the requirements comprise a list of dependent hardware events required for execution of the plurality of instructions, and the resources comprise resources that are required to execute all of the plurality of instructions to completion. In one embodiment, the dependent hardware events must be satisfied before a subsequent schedulable structure begins execution.

In one embodiment, in process 1200 the header further comprises an instruction count for a number of instructions that are loaded before the subsequent schedulable structure begins execution. In one embodiment, the plurality of instructions of the schedulable structure are executed without stalling. In one embodiment, the thread processing environment comprises a SIMT processing architecture, and the plurality of instructions are executed in a compilation process of a GPU.

In one embodiment, in process 1200 encapsulating the plurality of instructions into the schedulable structure comprises: analyzing an intermediate state of codes within each basic block and topology of a control flow graph during the compilation process of a GPU; partitioning the codes into regions for determining timing characteristics within a region such that the timing characteristics are known and enforced by static compiler scheduling; enforcing an availability of resulting values computed by non-deterministic latency instructions through a counter based waiting scheme; and utilizing a plurality of basic blocks and control flow graph heuristics for forming the schedulable structure.

In one embodiment, process 1200 further includes allocating one or more tunnel register files (e.g., register files 420, FIG. 4, FIG. 11) for the schedulable structure for use during execution of the plurality of instructions of the schedulable structure. In one embodiment, the schedulable structure comprises a trace (e.g., trace 650, FIG. 6), and the trace is a shader program fragment used for a GPU pipeline (e.g., pipeline 1100). In one embodiment, the plurality of instructions comprise shader core instructions. In one embodiment, the GPU is used by an electronic device (e.g., electronic device 120, FIG. 2). In one example embodiment, the electronic device is a mobile electronic device.

Figure 13:
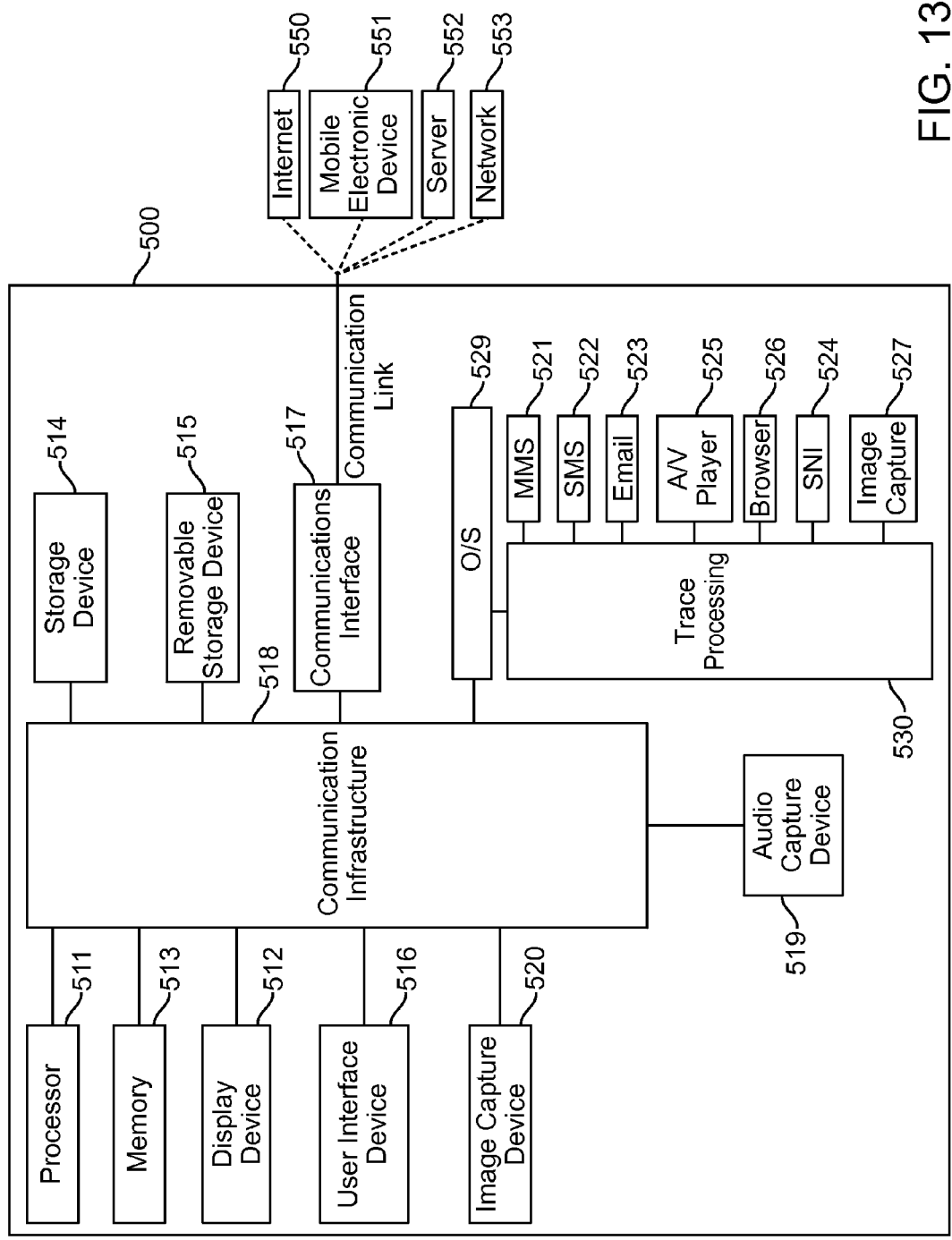
FIG. 13 is a high-level block diagram showing an information processing system comprising a computing system implementing one or more embodiments.

FIG. 13 is a high-level block diagram showing an information processing system comprising a computing system 500 implementing one or more embodiments. The system 500 includes one or more processors 511 (e.g., ASIC, CPU, etc.), and may further include an electronic display device 512 (for displaying graphics, text, and other data), a main memory 513 (e.g., random access memory (RAM), cache devices, etc.), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as Wi-Fi, Cellular), a network interface (such as an Ethernet card), a communications port, or a PCMCIA slot and card).

The communication interface 517 allows software and data to be transferred between the computer system and external devices through the Internet 550, mobile electronic device 551, a server 552, a network 553, etc. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of one or more embodiments in a mobile wireless device (e.g., a mobile phone, tablet, wearable device, etc.), the system 500 further includes an image capture device 520, such as a camera 128 (FIG. 2), and an audio capture device 519, such as a microphone 122 (FIG. 2). The system 500 may further include application modules as MMS module 521, SMS module 522, email module 523, social network interface (SNI) module 524, audio/video (AV) player 525, web browser 526, image capture module 527, etc.

In one embodiment, the system 500 includes a trace processing module 530 that may implement processing similar as described regarding trace 650 (FIGS. 6-12), and the pipeline 1100 (FIG. 11). In one embodiment, the trace processing module 530 may implement the process of flowchart 1200 (FIG. 12). In one embodiment, the trace processing module 530 along with an operating system 529 may be implemented as executable code residing in a memory of the system 500. In another embodiment, the trace processing module 530 may be provided in hardware, firmware, etc.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for executing instructions in a thread processing environment, the method comprising:
    determining a plurality of requirements that must be satisfied and resources that must be available for executing a plurality of instructions;
    encapsulating the plurality of instructions into a schedulable structure, wherein encapsulating the plurality of instructions into the schedulable structure comprises:
        analyzing an intermediate state of codes within each basic block and topology of a control flow graph during the compilation process;
        partitioning the codes into regions for determining timing characteristics within a region such that the timing characteristics are known and enforced by static compiler scheduling;
        enforcing an availability of resulting values computed by non-deterministic latency instructions through a counter based waiting scheme; and
        utilizing a plurality of basic blocks and control flow graph heuristics for forming the schedulable structure;
        configuring a header for the schedulable structure with information comprising the determined plurality of requirements and resources;
        scheduling the schedulable structure for executing each of the plurality of instructions using the information; and
        allocating at least one tunnel register file for the schedulable structure to store data for use within the schedulable structure,
    wherein the thread processing environment comprises a single instruction multi-thread (SIMT) processing architecture, and the plurality of instructions are executed in a compilation process.

2. The method of claim 1, wherein the requirements comprise a list of dependent hardware events required for execution of the plurality of instructions, and the resources comprise resources that are required to execute all of the plurality of instructions to completion.

3. The method of claim 2, wherein the dependent hardware events must be satisfied before a subsequent schedulable structure begins execution.

4. The method of claim 3, wherein the header further comprises an instruction count for a number of instructions that are loaded before the subsequent schedulable structure begins execution.

5. The method of claim 4, wherein the plurality of instructions of the schedulable structure are executed without stalling.

6. The method of claim 5, wherein the at least one tunnel register file is configured to not persist across schedulable structure boundaries.

7. The method of claim 6, wherein the schedulable structure comprises a trace data structure, and the trace data structure is a shader program fragment used for a graphical processing unit (GPU) pipeline.

8. The method of claim 7, wherein the plurality of instructions comprises shader core instructions.

9. The method of claim 8, wherein the GPU is used by an electronic device.

10. The method of claim 9, wherein the electronic device comprises a mobile electronic device.

11. A non-transitory computer-readable medium having instructions which when executed on a computer perform a method comprising:
    selecting a plurality of instructions to execute in a thread processing environment;
    determining a plurality of requirements that must be satisfied and resources that must be available for executing the plurality of instructions;
    encapsulating the plurality of instructions into a schedulable structure, wherein encapsulating the plurality of instructions into the schedulable structure comprises:
        analyzing an intermediate state of codes within each basic block and topology of a control flow graph during the compilation process;
        partitioning the codes into regions for determining timing characteristics within a region such that the timing characteristics are known and enforced by static compiler scheduling;
        enforcing an availability of resulting values computed by non-deterministic latency instructions through a counter based waiting scheme; and
        utilizing a plurality of basic blocks and control flow graph heuristics for forming the schedulable structure;
    configuring a header for the schedulable structure with information comprising the determined plurality of requirements and resources;
    scheduling the schedulable structure for executing each of the plurality of instructions using the information; and
    allocating at least one tunnel register file for the schedulable structure to store data for use within the schedulable structure,
    wherein the thread processing environment comprises a single instruction multi-thread (SIMT) processing architecture, and the plurality of instructions are executed in a compilation process.

12. The medium of claim 11, wherein the requirements comprise a list of dependent hardware events required for execution of the plurality of instructions, the resources comprise resources that are required to execute all of the plurality of instructions to completion, and the dependent hardware events must be satisfied before a subsequent schedulable structure begins execution.

13. The medium of claim 12, wherein the header further comprises an instruction count for a number of instructions that are loaded before the subsequent schedulable structure begins execution.

14. The medium of claim 13, wherein the plurality of instructions of the schedulable structure are executed without stalling.

15. The medium of claim 14, wherein the at least one tunnel register file is configured to not persist across schedulable structure boundaries.

16. The medium of claim 15, wherein the schedulable structure comprises a trace data structure, the trace data structure is a shader program fragment used for a graphical processing unit (GPU) pipeline, and the plurality of instructions comprises shader core instructions.

17. The medium of claim 16, wherein the GPU is used by a mobile electronic device.

18. A graphics processor for an electronic device comprising:
- at least one processing element coupled to a memory device, wherein the at least one processing element is configured to:
- select a plurality of instructions to execute;
- determine a plurality of requirements that must be satisfied and resources that must be available for executing the plurality of instructions;
- encapsulate the plurality of instructions into a schedulable structure, wherein the at least one processing element is further configured to encapsulate the plurality of instructions into the schedulable structure based on:
  - analyzing an intermediate state of codes within each basic block and topology of a control flow graph during the compilation process;
  - partitioning the codes into regions for determining timing characteristics within a region such that the timing characteristics are known and enforced by static compiler scheduling;
  - enforcing an availability of resulting values computed by non-deterministic latency instructions through a counter based waiting scheme; and
  - utilizing a plurality of basic blocks and control flow graph heuristics for forming the schedulable structure;
- configure a header for the schedulable structure with information comprising the determined plurality of requirements and resources;
- schedule the schedulable structure for executing each of the plurality of instructions using the information; and
- allocate at least one tunnel register file for the schedulable structure to store data for use within the schedulable structure, wherein the graphics processor comprises a single instruction multi-thread (SIMT) processing architecture, and the plurality of instructions are executed during a compilation process.

19. The graphics processor of claim 18, wherein the requirements comprise a list of dependent hardware events required for execution of the plurality of instructions, the resources comprise hardware resources that are required to execute all of the plurality of instructions to completion, and the dependent hardware events must be satisfied before a subsequent schedulable structure begins execution.

20. The graphics processor of claim 19, wherein the header further comprises an instruction count for a number of instructions that are loaded before the subsequent schedulable structure begins execution.

21. The graphics processor of claim 20, wherein the plurality of instructions of the schedulable structure are executed by the at least one processing element without stalling.

22. The graphics processor of claim 21, wherein the at least one tunnel register file is configured to not persist across schedulable structure boundaries.

23. The graphics processor of claim 22, wherein the schedulable structure comprises a trace data structure, the trace data structure is a shader program fragment used for a pipeline of the graphics processor, and the plurality of instructions comprises shader core instructions.

24. The graphics processor of claim 23, wherein the electronic device comprises a mobile electronic device.

* * * * *